(No Model.)

S. H. CLUXTON.
DEVICE FOR REPAIRING VEHICLE TIRES.

No. 594,066. Patented Nov. 23, 1897.

WITNESSES:
Charles W. Marvin.
Mary A. Franklin.

INVENTOR
Sidney H. Cluxton.

BY
Smith & Benison
ATTORNEYS.

UNITED STATES PATENT OFFICE.

SIDNEY H. CLUXTON, OF SYRACUSE, NEW YORK.

DEVICE FOR REPAIRING VEHICLE-TIRES.

SPECIFICATION forming part of Letters Patent No. 594,066, dated November 23, 1897.

Application filed January 26, 1897. Serial No. 620,787. (No model.)

*To all whom it may concern:*

Be it known that I, SIDNEY H. CLUXTON, of Syracuse, in the county of Onondaga, in the State of New York, have invented new and useful Improvements in Devices for Repairing Vehicle-Tires, of which the following, taken in connection with the accompanying drawings, is a full, clear, and exact description.

My invention relates to cycles and pneumatic tires therefor, and particularly to means, devices, and appliances for repairing or closing and sealing punctures therein.

My object is to produce a novel means for closing, sealing, and repairing punctures in pneumatic tires, comprising a repair-plug composed of a flexible hollow head mounted upon a tubular shank or stem and provided in its face, adjacent to the base of said stem, with perforations whereby the sealing cement can be applied to said face and to the interior face of the tire through said stem and head and its perforations. This plug is elastic, except as to the stem; but this is also expansible laterally. The head is elastic, so that by longitudinal pressure against its central portion it can be elongated and thereby reduced in size laterally, so as to be substantially of the size of the tool used, with the thickness of the material added, whereby it can be readily inserted through a small opening, and when the head is thus inserted and the tool is retracted slightly said head will reëxpand into its normal shape. Then suitable cement is suitably forced through said stem into said head and through its perforations onto its outer face around said stem and onto the inner wall of the tire, and then said plug can be drawn out to bring it into close contact with the tire and the puncture is closed and the projection of the plug is then cut off. It is constructed as follows, reference being had to the accompanying drawings, in which—

Figure 1:
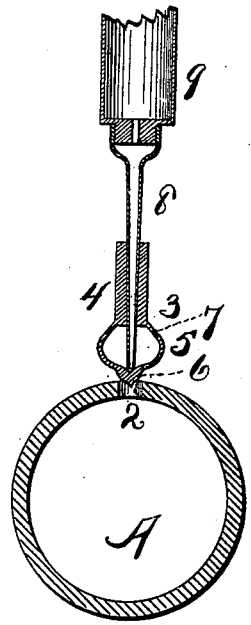
Figure 2:
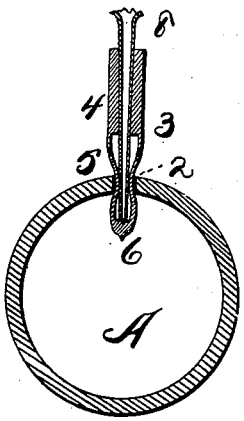
Figure 3:
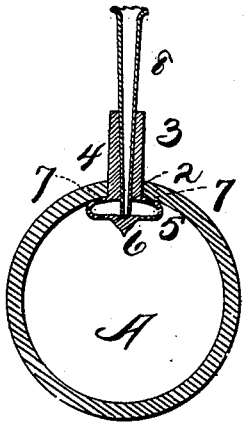
Figure 4:
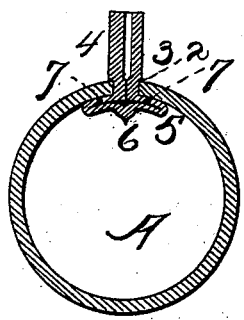
Figure 5:
Figure 6:
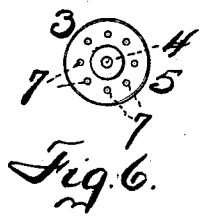

Figure 1 shows a cross-section of a tire and a plug partly elongated prior to insertion. Fig. 2 is a like view of the same, showing the plug partly inserted. Fig. 3 is a like view showing it inserted and the tool partly retracted. Fig. 4 is a like view showing the plug inserted, cemented, and the tool removed. Fig. 5 is a side elevation of a plug. Fig. 6 is a top plan thereof, showing perforations adjacent to the base of the stem.

A represents any ordinary pneumatic tire, the construction of which is immaterial to this invention.

At 2 a puncture is shown, possibly enlarged to better illustrate the principle involved by or in my invention, to receive the plug 3. This comprises a tubular shank or stem 4, a hollow head 5, usually provided with an apex 6, and with perforations 7, opening into the chamber of said head and arranged in any suitable manner adjacent to the base of said stem. The apex 6 is created by adding stock at that point, and this protects the head against perforation by the tool 8 and also permits more ready entrance of the plug into the puncture. This tool may be a rod or the tubular nozzle of any suitable injector 9. It is inserted into the stem, the head having been lubricated by cement or otherwise, if deemed necessary, and the apex applied to the puncture. Then the pressure upon said tool will elongate and stretch said head so that it will substantially lie against the sides of the tool for more ready or easier insertion. When inserted, the partial retraction of the tool will permit said head to resume its normal form transverse to said stem. Then the injection of cement into said head will cause it to flow through said perforations onto the face adjacent to the base of said stem. If the faces are then in contact, as in Fig. 3, said cement will thereby be applied to both of them and the tool can be removed. This permits the tire to resume its normal condition and to expansively close the neck of the plug and the opening therein, as shown in Fig. 4, and the pressure of air forced into the tire will close the chamber in the head, force it tightly against the tire, force a modicum of cement into the neck of the stem, and the puncture is closed, cemented, and sealed. After this the projecting end of the stem can be cut off. The cement applied to lubricate the plug will coat the walls of the puncture and cement them to said stem. The cement is thus applied through the stem and head of the plug directly to the faces to be secured together, the neck of the stem closed and cemented, the walls of the chamber in the head are cemented together, and the walls of the puncture are cemented to the stem.

Having described my invention, what I claim, and desire to secure by Letters Patent, is—

1. A puncture-closing plug comprising a tubular stem and a hollow head provided with perforations adjacent to said stem.

2. A puncture-closing plug comprising a tubular stem and a hollow and longitudinally-elastic head provided with perforations adjacent to said stem.

3. A puncture-closing plug comprising a tubular stem and a hollow perforated and longitudinally-elastic head provided with an apex.

4. The combination with a tire of a puncture-closing plug comprising a tubular and laterally expansible and compressible stem, and a hollow and perforated and longitudinally-elastic head provided with an apex.

5. A puncture-closing plug comprising a tubular stem and a transverse head hollow, perforated and elastic in the direction of the bore of the stem.

In witness whereof I have hereunto set my hand this 19th day of January, 1897.

SIDNEY H. CLUXTON.

In presence of—
  MARY A. FRANKLIN,
  HOWARD P. DENISON.